US00RE45075E

(19) United States
(12) Reissued Patent
Hirose et al.

(10) Patent Number: US RE45,075 E
(45) Date of Reissued Patent: Aug. 12, 2014

(54) PROFILE GRINDING MACHINE

(71) Applicant: Mitsui High-Tec, Inc., Kitakyushu (JP)

(72) Inventors: Tadao Hirose, Fukuoka (JP); Hiroshi Iwakiri, Fukuoka (JP); Akikazu Higuchi, Fukuoka (JP); Atsushi Nagata, Fukuoka (JP)

(73) Assignee: Mitsui High-Tec, Inc., Fukuoka (JP)

(21) Appl. No.: 13/657,894

(22) Filed: Oct. 23, 2012

Related U.S. Patent Documents

Reissue of:
(64) Patent No.: 8,216,025
Issued: Jul. 10, 2012
Appl. No.: 11/743,951
Filed: May 3, 2007

(30) Foreign Application Priority Data

Jun. 5, 2006 (JP) ..... 2006-156288

(51) Int. Cl.
*B24B 49/12* (2006.01)

(52) U.S. Cl.
USPC ..... 451/11; 451/6

(58) Field of Classification Search
USPC ..... 451/11, 6, 236, 61, 121, 5
See application file for complete search history.

(56) References Cited

U.S. PATENT DOCUMENTS

| | | | |
|---|---|---|---|
| 2,614,368 | A | 10/1952 | Polk et al. |
| 4,296,571 | A | 10/1981 | Horvath |
| 5,321,914 | A | 6/1994 | Husson |
| 6,712,675 | B1 | 3/2004 | Giurgiuman et al. |
| 6,881,130 | B1 | 4/2005 | Stocker |
| 2006/0128274 | A1 | 6/2006 | Nyffenegger |

FOREIGN PATENT DOCUMENTS

| | | |
|---|---|---|
| JP | 2-250760 | 10/1990 |
| JP | 4-93150 | 3/1992 |
| JP | 5-200649 | 8/1993 |
| JP | 10-58283 | 3/1998 |
| JP | 10-138112 | 5/1998 |
| JP | 10-315111 | 12/1998 |
| JP | 2001-150323 | 6/2001 |
| JP | 2002-127004 | 5/2002 |
| JP | 2003-25207 | 1/2003 |
| JP | 2003-503225 | 1/2003 |
| JP | 2003-516237 | 5/2003 |
| JP | 2003-285253 | 10/2003 |
| JP | 2006-62077 | 3/2006 |

OTHER PUBLICATIONS

Japan Office action, dated Dec. 4, 2012 along with an english translation thereof.
Japan Office action, dated May 28, 2012 along with an english translation thereof.
Japan Office action, dated Jun. 4, 2012 along with an english translation thereof.
English language Abstract of JP 10-138112.

*Primary Examiner* — Robert Rose
(74) *Attorney, Agent, or Firm* — Greenblum & Bernstein P.L.C.

(57) ABSTRACT

The profile grinding machine includes: a base; a work unit disposed on one side on the base and including a work table for gripping a work; and a stone unit disposed on the other side on the base and including a stone rotating mechanism for holding and rotating a grinding stone on its axis. The work unit includes first to third moving device for supporting and moving the work table in an X-direction and a Y-direction perpendicular to each other in a horizontal plane, and in a Z-direction normal to the horizontal plane, respectively. The stone unit includes turning mechanism for turning the grinding stone about a vertical axis substantially coinciding with the leading end portion of the grinding stone.

7 Claims, 8 Drawing Sheets

PROFILE GRINDING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a profile grinding machine for grinding a recess made open in the side face of a work, smoothly.

2. Related Art

Conventionally, in case a ground face inclined with respect to a vertical line is formed in the inner face of a recess made open in the side face of a work, as shown in FIG. 2, the work is fixed on a work table, and the grinding stone is manually inclined before the grinding operation in accordance with the angle of inclination of the ground face to be formed, so that the moving direction of the leading end of the grinding stone is set in parallel with the ground face to be formed. In case the angles of inclination of the ground faces to be formed are different for the individual faces, therefore, the angles of the grinding stone have to be readjusted for the individual faces thereby to complicate the profile grinding operations. Thus, there has been proposed (as referred to JP-A-10-138112, for example) a profile grinding machine, in which a movable base is so disposed on the back of the work table for supporting and fixing the work as can rock forward and backward, and rightward and leftward with respect to the work table, in which the movable base is provided with a first rocking frame having a first rocking action device automatically adjusted to rock forward and backward with respect to a first rocking shaft, and a second rocking frame disposed on the front side of the first rocking frame and having a second rocking action device automatically adjusted to rock rightward and leftward with respect to a second rocking shaft intersecting at a right angle with the first rocking shaft, and in which a grinding stone head having a stone wheel rotationally driven is so disposed on the front side of the second rocking frame as can reciprocate upward and downward.

In case, however, the profile grinding machine described in JP-A-10-138112 is used to grind the individual inner faces of the recess thereby to form the inclined ground faces, the grinding stone is inclined in advance to the angle of inclination of the ground faces. Therefore, the depth of cut of the work by the grinding stone is set constant from the cutting side of the grinding stone to the leaving side. In case, therefore, the grinding operation to start the cutting of the grinding stone from the upper face side of the work and to extract the grinding stone from the back face side of the work is performed from one side to the other of the recess in a top plan view, as shown in FIG. 7 and FIG. 8, there arises a problem that the grounding quantities of the lower face side (or the leaving side of a grinding stone 85), as indicated by broken lines, of a work 84 are excessive for the designed quantity in a corner area 83, in which two adjoining surfaces (or inner faces) 80 and 81 (or the surfaces 81 and 87) of a recess 82 of the work 84. This raises a limit to the precision in the inner face shape of the recess 82 after ground.

In case, moreover, the grinding operation is started from one side to the other of the recess 82, it is so performed with the leading end portion 86 of the grinding stone 85 being inclined with respect to the surfaces 80, 81 and 87 of the work 84 as to prevent the interference between the grinding stone 85 and one side of the work 84 and the excessive wear of the leading end portion 86 of the grinding stone 85. As a result, when the leading end portion 86 of the grinding stone 85 approaches the other side of the recess 82, there arise a problem that the side portion of the grinding stone 85 interferes with the other side of the recess 82 so that the grinding operation cannot be performed. This makes it necessary to turn a stone head 88 thereby to change the angle of inclination of the leading end portion 86 of the grinding stone 85 with respect to the surface 87 of the work 84. As shown in FIG. 8A, however, the position of the center axis of turn 89 of the stone head 88 and the center position of the leading end portion 86 of the grinding stone 85 are generally spaced by a distance L. As shown in FIG. 8B, therefore, when the stone head 88 is turned, the center of the leading end portion 86 moves on the center axis of turn 89 along the arc having a radius of a distance L between the center axis of turn 89 and the center of the leading end portion 86 of the grinding stone 85. As a result, there arises a problem that the grinding stone 85 collides against the other side of the recess 82, as shown in FIG. 8C. Before the grinding stone 85 interferes with the other side of the recess 82, therefore, the grinding stone 85 is relieved from the work 84 so that the angle of inclination of the leading end portion 86 of the grinding stone 85 with respect to the surface of the work 84 is readjusted to reopen the grinding operation. Alternatively, the grinding operations of the inner faces of the recess 82 are individually performed by dividing them for one side area and the other side area. As a result, the preparing steps before the grinding operations increase to raise a problem that the total time period required for the grinding operations is elongated.

SUMMARY OF THE INVENTION

The invention has been conceived in view of those backgrounds, and has an object to provide a profile grinding machine capable of grinding a recess made open in the side face of a work, smoothly.

According to the invention to satisfy the aforementioned object, there is provided a profile grinding machine including:

a base;

a work unit disposed on one side on the base and including a work table for gripping a work; and a stone unit disposed on another side on the base and including a stone rotating mechanism for holding and rotating a grinding stone about axis thereof, wherein the work unit includes first, second and third moving devices for supporting and moving the work table in an X-direction and a Y-direction intersecting with each other in a horizontal plane, and in a Z-direction normal to the horizontal plane, respectively; and the stone unit includes a turning mechanism capable of turning the grinding stone about a vertical axis substantially coinciding with a leading end portion of the grinding stone.

In the profile grinding machine according to the invention, the turning mechanism may include a rotating table disposed above the base for rotating about the rotation axis of the turning mechanism, and fourth and fifth moving devices disposed above the rotating table far supporting and moving the stone rotating mechanism, respectively, in a U-direction and a V-direction intersecting with each other in a horizontal plane.

According to the invention, the profile grinding machine may include an image pickup mechanism including a camera disposed above the base for taking the images of the work unit and the stone unit downward.

In the profile grinding machine according to the invention, by operating the first to third moving devices, in synchronism with the movement of the work gripped on the work table in the Z-direction, the work can be moved in the X-direction and in the Y-direction, so that the cut of depth of the work by the grinding stone can be changed upward and downward. As a result, in case the grinding operation to start the cutting operation of the grinding stone from the upper face side of the work and to extract the grinding stone from the lower face side of the work is performed from one side to the other of the recess, as viewed in a top plan view, the grinding quantities of the lower face side (or the leaving side of the grinding stone) of the corner area, in which the two adjoining surfaces (or the inner faces) of the recess of the work can be adjusted to the designed quantity thereby to form the ground faces excellent in the shaping precision with respect to the vertical direction, in the individual inner faces of the recess.

Moreover, the stone unit is provided with the turning mechanism for turning the grinding stone on the vertical line substantially coinciding with the leading end portion of the grinding stone. Therefore, even if the grinding stone is turned, the contacting position moves along the outer circumference of the leading end portion of the grinding stone so that the grinding stone can be prevented from interfering the work even if it is turned during the grinding operation. As a result, the grinding stone is gradually rotated while moving from one side to the other of the recess, so that the grinding stone can be prevented, even if it enters the other side area, from interfering with the other side of the recess. As a result, the ground faces inclined with respect to the directions normal to the individual inner faces of the recess of the work can be formed at one time by the single grinding operation.

Especially in the profile grinding machine according to one additional feature of the invention, the stone rotating mechanism can be moved over the rotating table. Even if the leading end portion of the grinding stone is worn to have its sizes changed by working it again or if the stone sizes are changed according to the work shape, the center position of the leading end portion of the grinding stone can be easily aligned with the rotation axis of the turning mechanism.

In the profile grinding machine according to another additional feature of the invention, the work positioning confirmation before the grinding operation and the work shape confirmation after the working operation can be done by taking the image of the work fixed on the work table with the camera. By taking the image of the grinding stone attached to the stone rotating mechanism with the camera, moreover, the confirmation of the shape of the leading end portion of the grinding stone, the confirmation of the stone position (e.g., the conformation of the alignment between the center position of the leading end portion of the grinding stone and the axis of rotation) can be performed. Moreover, the confirmation of the position of the grinding origin can be performed by taking the images of the work and the grinding stone simultaneously with the camera.

DETAILED DESCRIPTION OF THE PREFERRED EMBODIMENTS

Subsequently, the invention is described on its mode of embodiment with reference to the accompanying drawings so that it may be understood.

Figure 1:
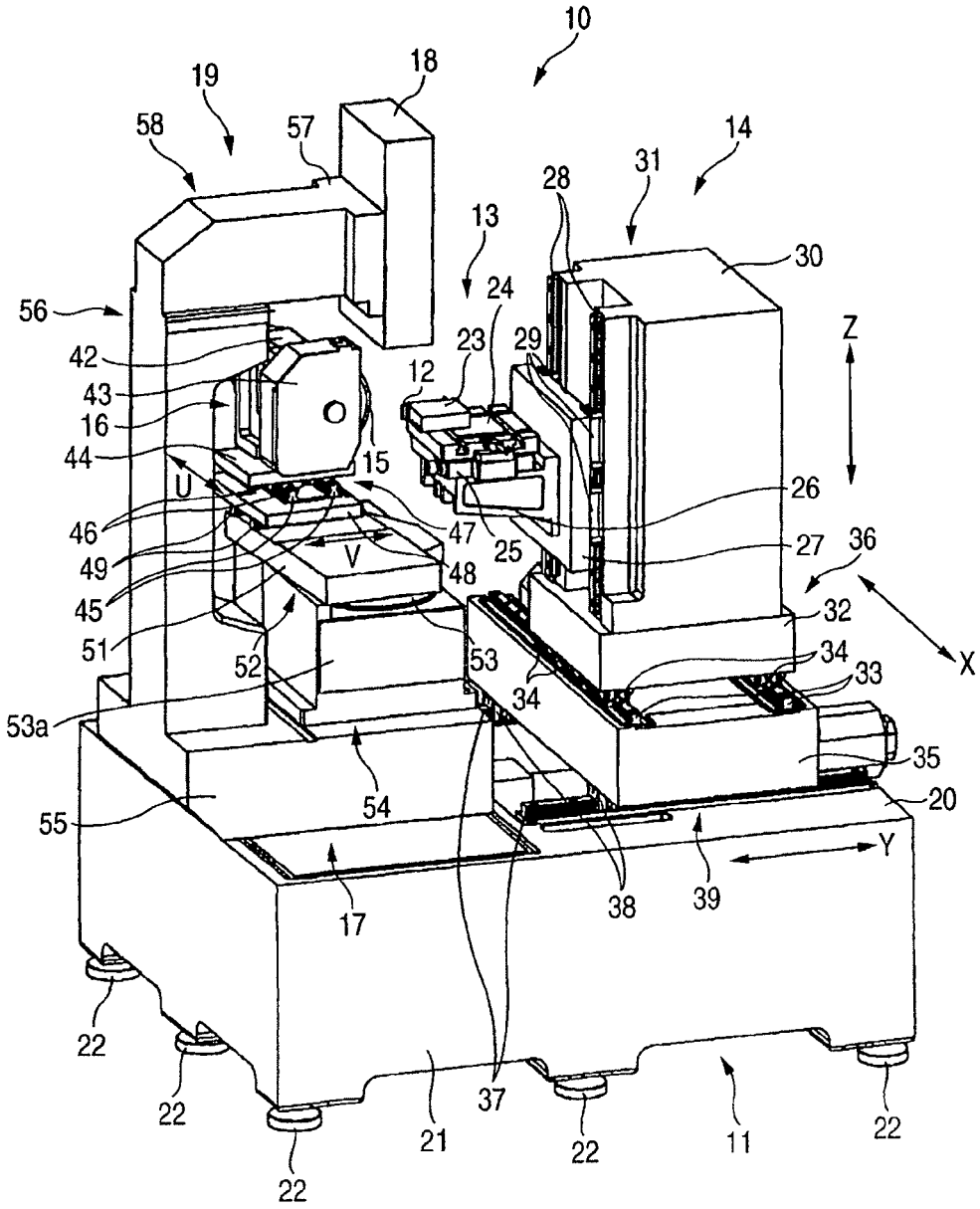
FIG. 1 is a perspective view of a profile grinding machine according to one mode of embodiment of the invention.
Figure 2C:
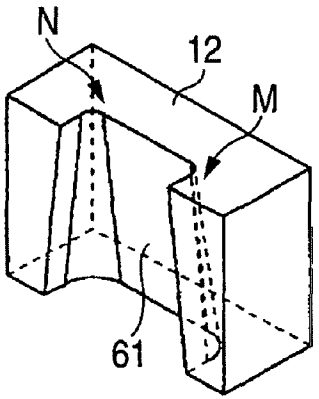
FIGS. 2A to 2C are individually perspective view of a work to be ground by the profile grinding machine.
Figure 2B:
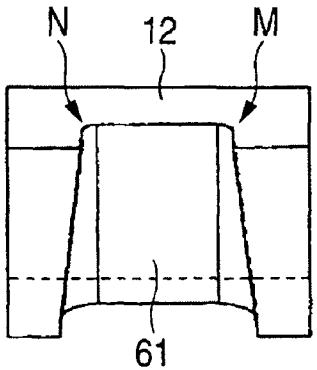
Figure 2A:
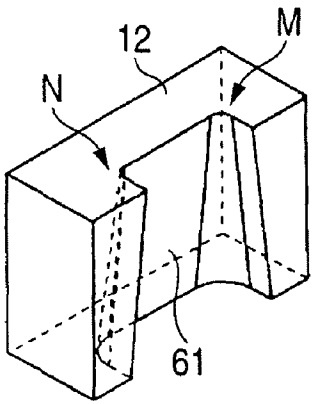
Figure 3:
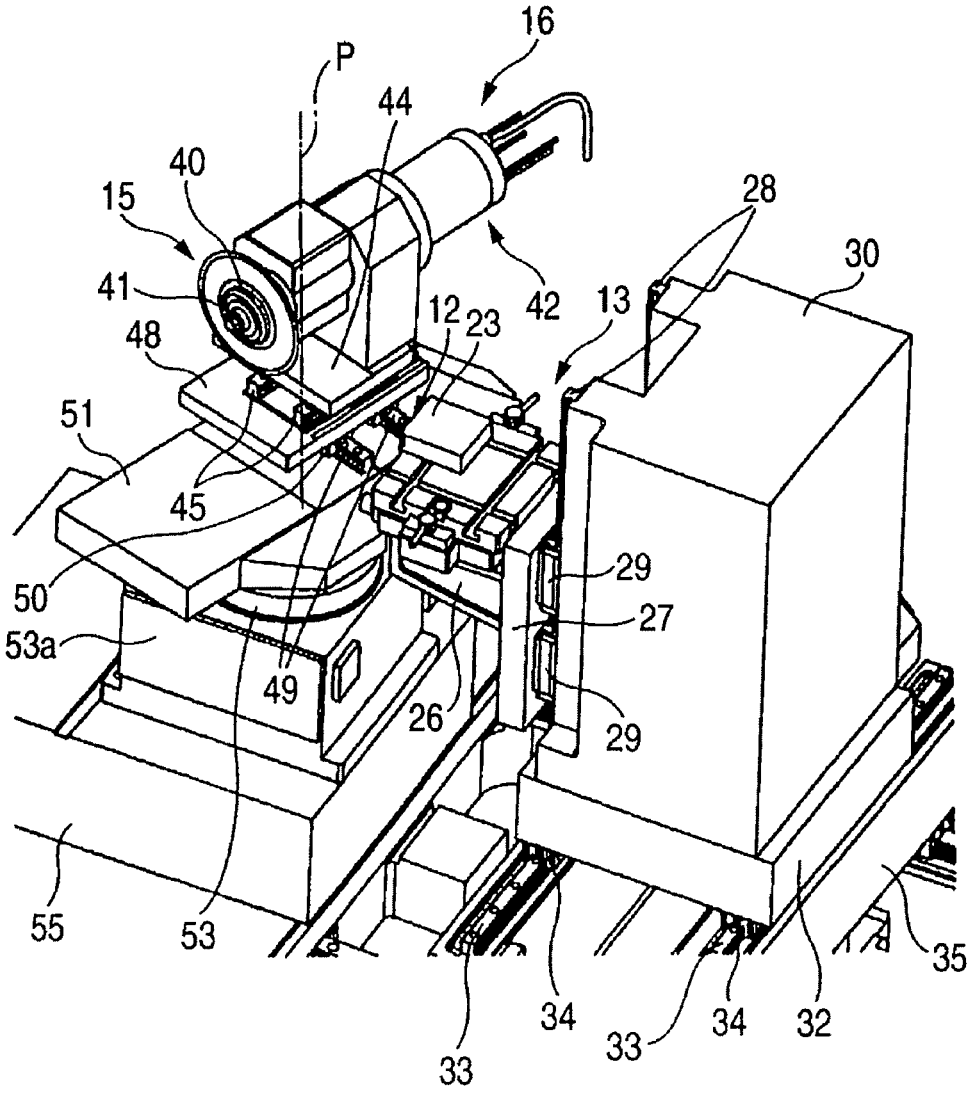
FIG. 3 is a perspective view of a turning mechanism, which is disposed in a grinding stone unit of the same profile grinding machine.
Figure 4:
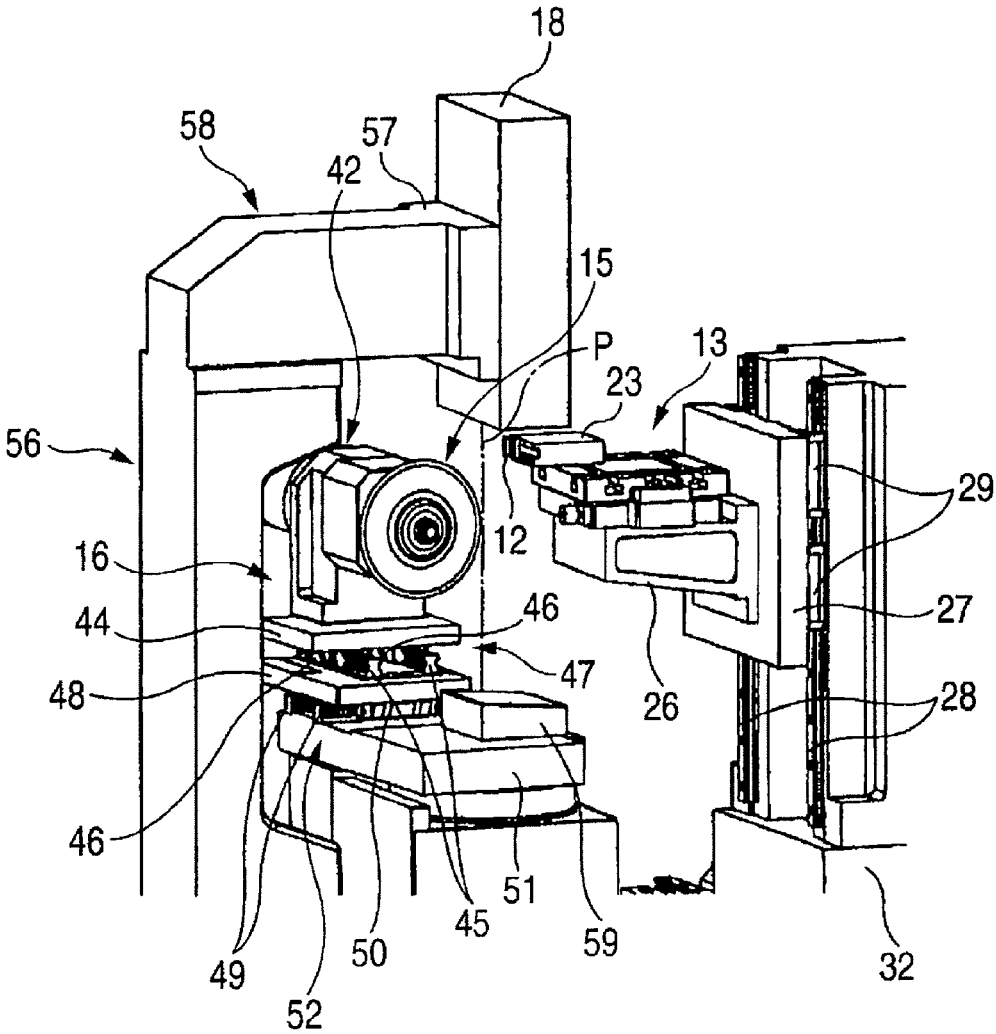
FIG. 4 is a perspective view of an image pickup mechanism of the same profile grinding machine.
Figure 5:
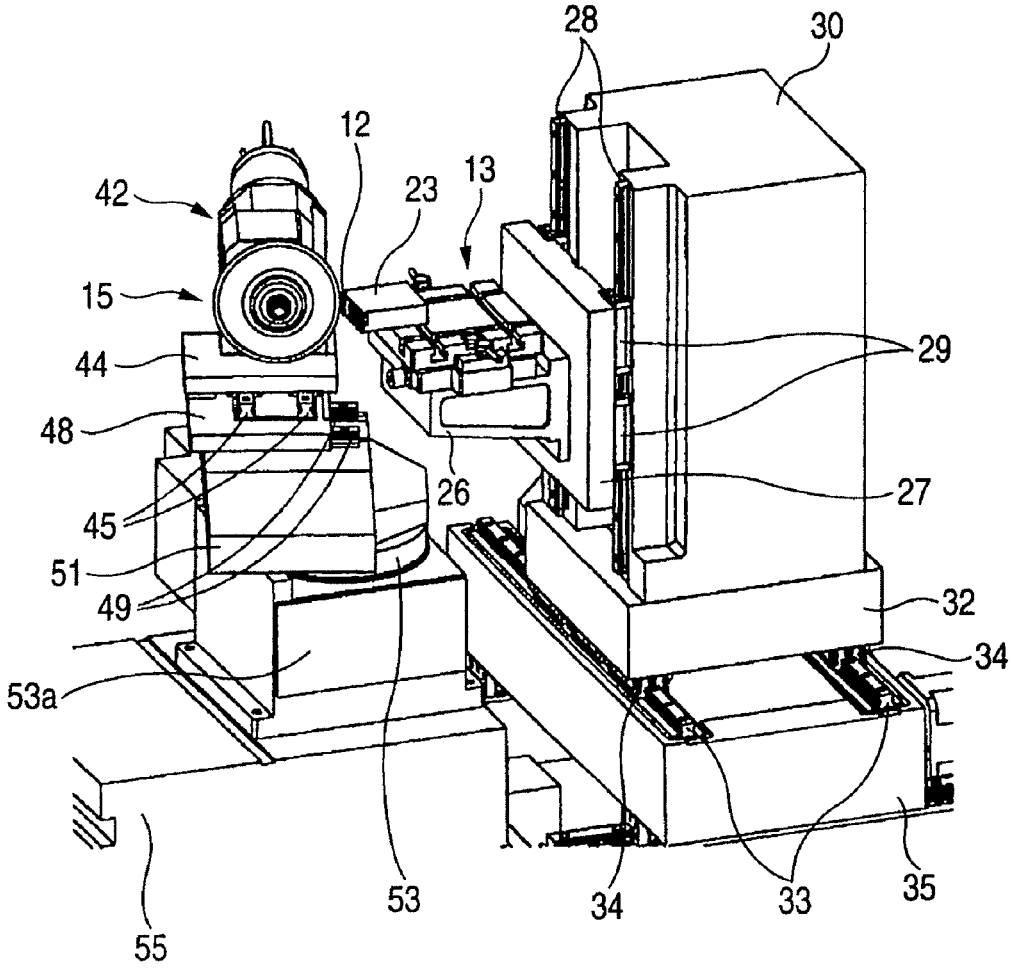
FIG. 5 is a perspective view showing the situation, in which the work is ground in its face inclined in a vertical direction by the same profile grinding machine.
Figure 6:
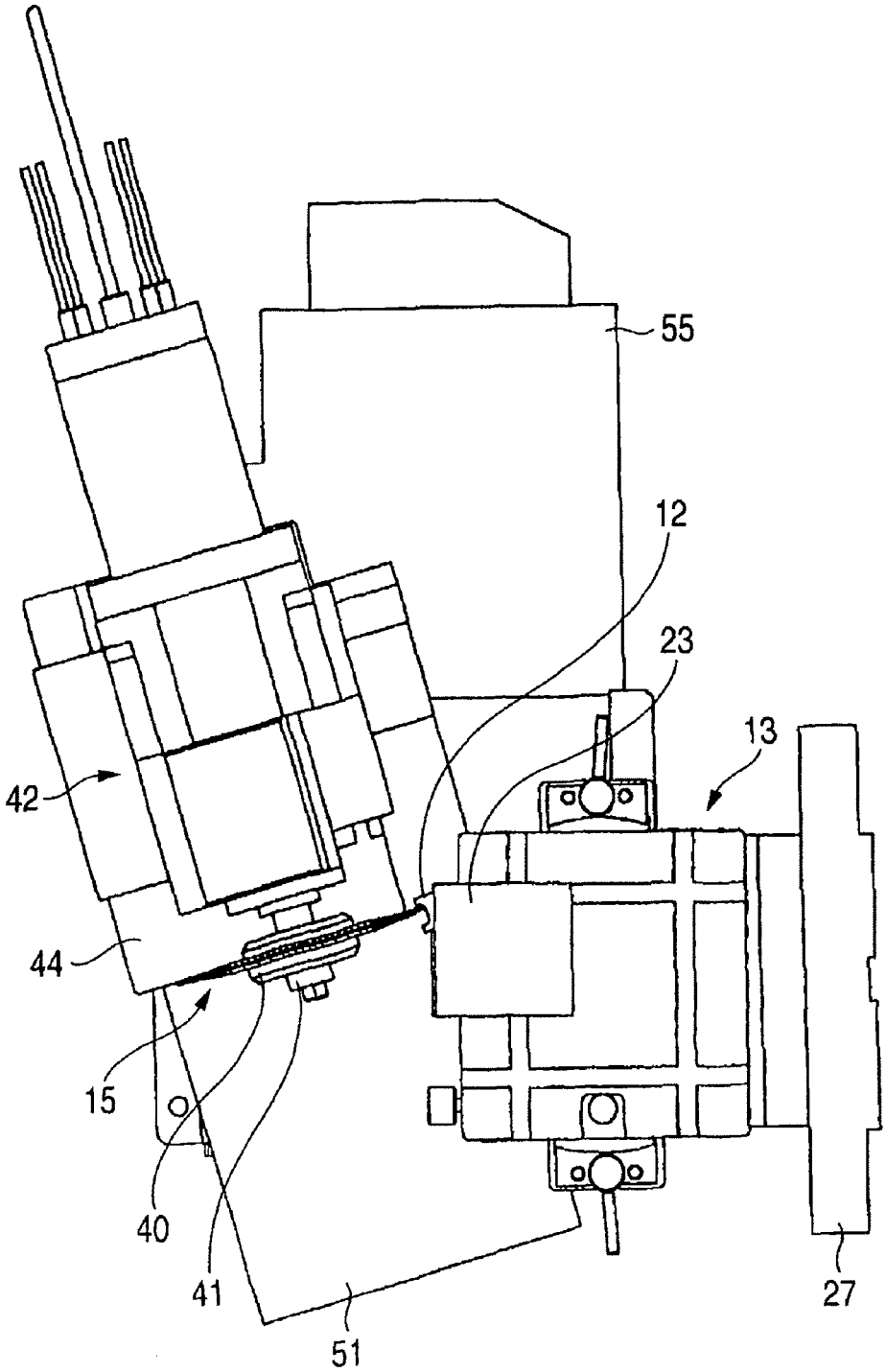
FIG. 6 is a top plan view showing, the situation, in which the work is ground in its face inclined in a vertical direction by the same profile grinding machine.
Figure 7:
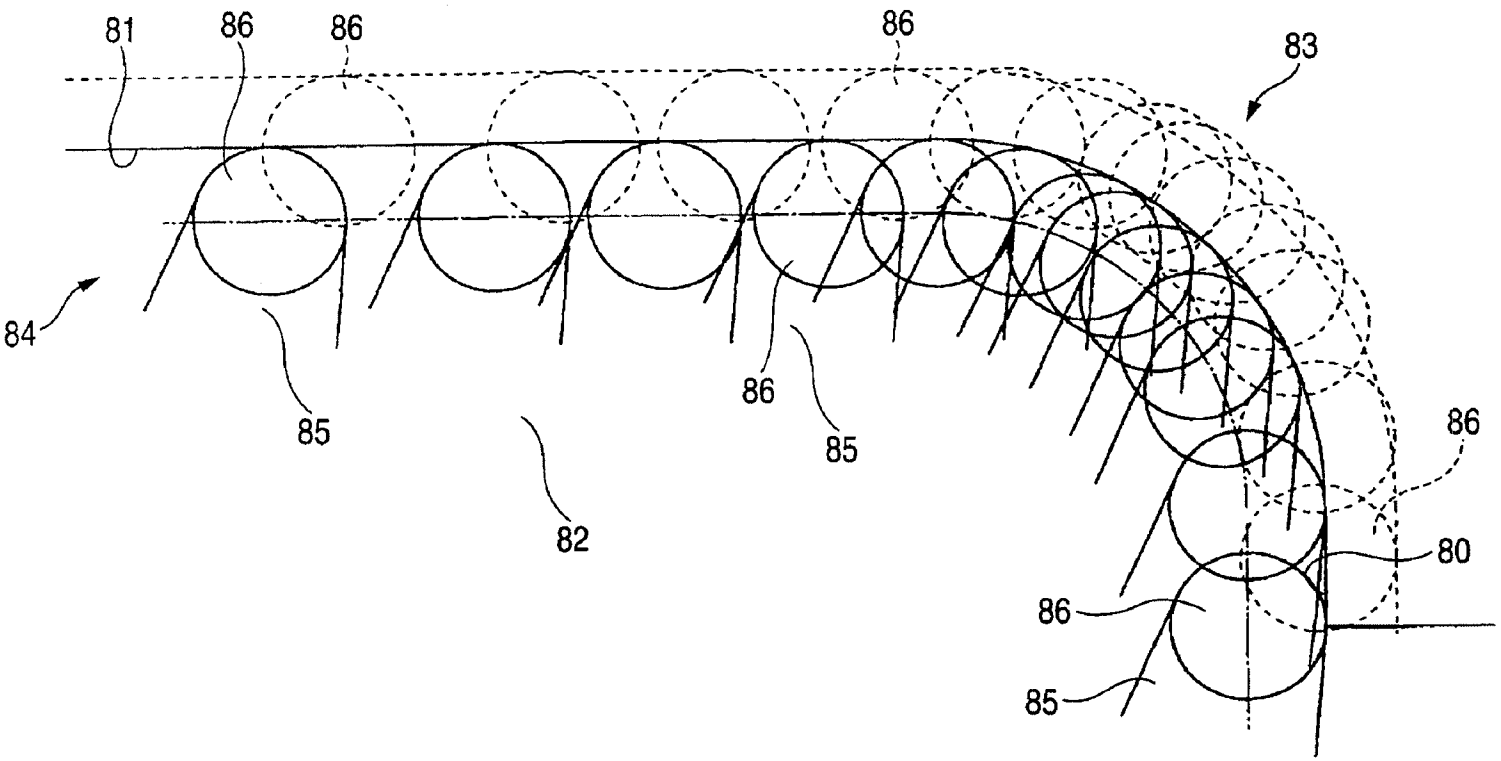
FIG. 7 is an explanatory diagram showing the locus of the leading end portion of a grinding stone at the working time when a profile grinding machine according to an example of the prior art is used.
Figure 8A:
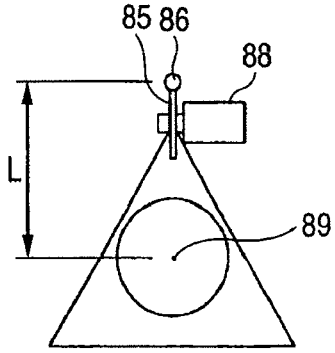
FIG. 8A is an explanatory diagram showing a discrepancy between the position of the turning center axis of a grinding stone head and the center position of the leading end portion of a grinding stone in a profile grinding machine according to an example of the prior art.
Figure 8B:
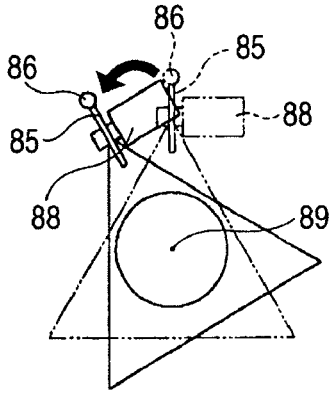
FIG. 8B is an explanatory diagram showing the movement of the center of the leading end portion of the grinding stone at the time when the grinding stone head is turned.
Figure 8C:
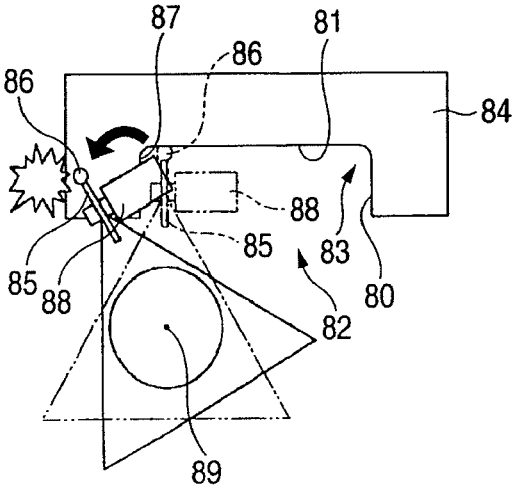
FIG. 8C is an explanatory diagram showing the situation, in which the grinding stone is brought to collide against the other side of the recess by the turn of the grinding stone head.

Here, FIG. 1 is a perspective view of a profile grinding machine according to one mode of embodiment of the invention; FIGS. 2A to 2C are perspective view of a work to be ground by the profile grinding machine; FIG. 3 is a perspective view of a turning mechanism, which is disposed in a grinding stone unit of the same profile grinding machine; FIG. 4 is a perspective view of an image pickup mechanism of the same profile grinding machine; FIG. 5 is a perspective view showing the situation, in which the work is ground on its face inclined in a vertical direction by the same profile grinding machine; and FIG. 6 is a top plan view showing the situation, in which the work is ground on its face inclined in a vertical direction by the same profile grinding machine.

As shown in FIG. 1, a profile grinding machine 10 includes: a base 11 installed in position; a work unit 14 having a work table 13 disposed on one side on the base 11 for gripping a work 12; a stone unit 17 disposed on the other side on the base 11 for holding and rotating a grinding stone 15 on its axis; and an image pickup mechanism 19 having a camera 18 for picking up the images of the work unit 14 and the stone unit 17 downward. The profile grinding machine 10 is described in detail in the following.

The base 11 includes a base structure 21 made of a highly rigid material such as cast iron and having a flat face 20 on its upper portion, and a plurality of leg members 22 attached to the lower portion of the base structure 21 and having adjustable heights. As a result, the flat face 20 of the base structure 21 can be brought into a horizontal state by adjusting the heights of the individual leg members 22 according to the levels of the place of installation.

The work table 13 includes: a work fixing bed 23 such as a magnet chuck for gripping the work 12 directly; a first work bed 24 for supporting the work fixing bed 23; a second work bed 25 for supporting the first work bed 24 in a manner to rotate at a fine angle in a horizontal plane (i.e., in a plane parallel to the flat face 20 of the base structure 21; and a third work bed 26 for supporting the second work bed 25. With this constitution, the work fixing bed 23 can be rotated at the fine angle through the first work bed 24 so that the position of the work 12 attached to the work fixing bed 23 can be finely adjusted.

The work unit 14 is provided with a third moving device 31 including: a mounting bed 27 for fixing the base side of the third work bed 26 of the work table 13; a Z-direction carriage 29 adapted to move back and forth on a pair of Z-direction rails 28 attached to the back side of the mounting bed 27 and arranged in parallel with a Z-direction normal to the horizontal face; and a Z-axis column 30 for supporting the Z-direction rails 28. The work unit 14 is further provided with: a first moving device 36 including a column bed 32 for mounting the Z-axis column 30, an X-direction carriage 34 adapted to move back and forth on a pair of X-direction rails 33 attached to the back side (or the lower face side) of the column bed 32 and arranged in parallel with the X-direction of the horizontal face, and an X-axis column 35 for supporting the X-direction rails 33; and a second moving device (39) including a Y-direction including a Y-direction carriage 38 adapted to move back and forth on a pair of Y-direction rails 37 attached to the back side (or the lower face side) of the X-axis column 35 and arranged on one side on the flat face 20 of the base structure 21, e.g., in parallel with the Y-direction perpendicular to the X-direction.

With this constitution, the work 12 can be moved back and forth in the Z-direction through the work table 13 by moving the mounting bed 27 back and forth in the Z-direction. Moreover, the X-direction carriage 34 can be moved back and forth in the Y-direction by moving the Y-direction carriage 3 back and forth in the Y-direction, and the mounting bed 27 can be moved back and forth in the X-direction by moving the X-direction carriage 34 back and forth in the X-direction. As a result, the work 12 can be moved in the X-direction and in the Y-direction in synchronism with the movement of the work 12 gripped on the work table 13, by moving the Y-direction carriage 38 and the X-direction carriage 34, respectively, in the Y-direction and in the X-direction while moving the mounting bed 27 back and forth in the Z-direction.

As shown in FIGS. 1, 3 and 4, the stone rotating mechanism 16 is provided with an electric motor 42, which has a spindle 41 fitted in the mounting hole of a mounting member 40 (as referred to FIG. 6) disposed at the center portion of the grinding stone 15 and connected to the mounting member 40, and a stone cover 43, which is attached to the electric motor 42 for covering the grinding stone 15 connected to the spindle 41. In the stone cover 43, moreover, there is disposed a not-shown nozzle, which is disposed close to but separately of the profile grinding machine 10 for feeding a grinding liquid fed from a not-shown grinding liquid feeder, to the leading end portion of the grinding stone 15.

The stone unit 17 is provided with: a fourth moving device 47 including a mounting bed 44 for mounting the electric motor 42 of the stone rotating mechanism 16, and a U-direction carriage 46 adapted to move back and forth on a pair of U-direction rails 45 attached to the back side of the mounting bed 44 and arranged in parallel with the U-direction (parallel to the X-direction in FIG. 1); a fifth moving device 52 a U-direction rail supporting bed 48 for supporting the U-direction rails 45, a V-direction carriage 50 adapted to move back and forth on a pair of V-direction rails 49 attached to the back side of the Y-direction rail supporting bed 48 and arranged on a horizontal plane, e.g., in parallel with the V-direction (parallel to the Y-direction in FIG. 1) perpendicular to the U-direction, and a V-direction rail supporting bed 51 for supporting the V-direction rails 49; and a turning mechanism 54 including a rotating table 53 mounting the V-direction rail supporting bed 51 for rotating about the rotation axis P normal to the flat face 20 of the base 11, and a table cover 53a for covering the side portion of the rotating table 53. Moreover, the turning mechanism 54 is attached to one side of a rotating table platform 55 fixed on the other side of the flat face 20 of the base 11.

With this constitution, when the rotating table 53 is rotated, the stone rotating mechanism 16 turns on the rotation axis P of the rotating table 53 so that the grinding stone 15 also turns on the rotation axis P of the rotating table 53. By moving the mounting bed 44 and the U-direction rail supporting bed 48 respectively in the U-direction and in the V-direction, moreover, the stone rotating mechanism 16 attached to the mounting bed 44 can be moved to an arbitrary position in a horizontal plane over the rotating table 53. By adjusting the individual moving strokes of the mounting bed 44 and the U-direction rail supporting bed 48, moreover, the center position of the leading end portion of the grinding stone 15 can be substantially aligned with the rotation axis P of the rotating table 53. As a result, even when the rotating table 53 is rotated, the center of the leading end portion of the grinding stone 15 can be only rotated but not turned on the rotation axis P of the rotating table 53.

The image pickup mechanism 19 includes: a camera post 56 erected on the other side above the rotating table platform 55 in parallel with the same direction as the Z-direction and arranged to have its leading portion at a position above the stone rotating mechanism 16; a camera supporting member 58 attached to the leading portion of the camera post 56 in the same direction as the Y-direction (or the V-direction); and the camera (e.g., a video camera having an image pickup element of a CCD and having a zooming function) 18 fixed on a camera mounting portion 57. The image pickup mechanism 19 further includes a camera illuminator 59 (e.g., an illuminating having a light source of a highly luminous light emitting diode) mounted on the V-direction rail supporting bed 51, for example, at the imaging time). The image pickup mechanism 19 further includes a (not-shown) display for displaying the image taken by the camera 18, thereby to perform the work position confirmation before the grounding operation, the work shape confirmation after the grinding operation, the confirmation of the leading end shape of the grinding stone, the confirmation of the grinding stone position, and the confirmation of the position of the grinding origin.

Here, the profile grinding machine 10 has a manual control function to move the mounting bed 27, the U-direction carriage 38 and the X-direction carriage 34 manually back and forth respectively in the Z-direction, in the Y-direction and in the X-direction thereby to rotate the rotating table 53 manually on the rotation axis P, and is provided with a not-shown numerical control device for moving the mounting bed 27, the Y-direction carriage 38 and the X-direction carriage 34 automatically back and forth by predetermined distances respectively in the Z-direction, in the Y-direction and in the X-direction, and for rotating the rotating table 53 automatically by a preset angle on the rotation axis P thereof. As a result, when a grinding program is created on the basis of a preset drawing and inputted to the numerical control device, the operation to grind the work 12 gripped by the work table 13 can be automatically performed.

Here is described a grinding method of the case, in which ground faces inclined at a constant angle with respect to a vertical direction are formed all at once by a single grinding operation, in the individual inner faces of a recess 61 made open in the side face of the work 12, as shown in different perspective directions in FIGS. 2A to 2C.

First of all, the grinding program for the numerical control device of the profile grinding machine 10 is created on the basis of design drawings. Here, the work 12 has a mounting reference plane formed in advance to provide a reference at the time when it is mounted on the work fixing bed 23. By fitting the mounting reference plane to the stationary reference plane of the work fixing bed 23, the mounting direction and the mounting position of the work attached to the work fixing bed 23 can be determined with respect to the origin of the profile grinding machine 10.

Next, the mounting bed 44 and the U-direction rail supporting bed 48 are moved back and forth respectively in the U-direction and the V-direction thereby to align the center position of the leading end portion of the grinding stone 15 of the stone rotating mechanism 16 attached to the mounting bed 44, with the rotation axis P of the rotating table 53. At this time, the rotating table 53 is rotated, as shown in FIG. 3, and the state at this time is taken by the camera 18 and displayed in the display, as shown in FIG. 4, thereby to confirm it when the rotating table 53 is rotated that the center position of the leading end portion of the grinding stone 15 is not offset from the rotation axis P of the rotating table 53.

When the operation to align the center position of the leading end portion of the grinding stone 15 and the position of the rotation axis P of the rotating table 53 is ended, the mounting bed 27, the Y-direction carriage 38 and the X-direction carriage are moved by the manual operations, respectively in the Z-direction, in the Y-direction and in the X-direction, the work fixing bed 23 is rotated by a fine angle through the first work bed 24 thereby to adjust the position of the work 12 attached to the work fixing bed 23, finely so that the grinding starting point of the work 12 is adjusted to the grinding original position set on the grinding program. By taking the images of the grinding starting point of the work 12 and the leading end portion of the grinding stone simultaneously with the camera and displaying them in the display, it can be confirmed from the qualitative positional relation between the grinding starting point of the work 12 and the leading end portion of the grinding stone whether or not the grinding starting point of the work 12 is aligned with the grinding original position set on the grinding program.

When the alignment of the grinding original position is ended, the grinding starting switch of the numerical control device is turned ON. Then, the depth of cut of the grinding stone 15 is started from the upper face side of the work 15, for example, so that the grinding operation to extract the grinding stone 15 from the back side (or the lower face side) of the work 12 is started from one side to the other side of the recess 61. Here, the ground situation and the confirmation of the shape of the work 12 can be performed on the spot by taking the state of the work 12 being or after ground and by displaying it in the display.

Here, by moving the Y-direction carriage 38 and the X-direction carriage 34 back and forth, respectively, in the Y-direction and in the X-direction while moving the mounting bed 27 back and forth, the work 12 can be moved in the X-direction and in the Y-direction in synchronism with the Z-direction movement of the work 12 gripped on the work table 13. Therefore, the grinding quantities of the lower face sides (or the sides, which the grinding stone leaves) of corner areas M and N of the recess 61, in which two adjoining faces intersect, can be adjusted to the designed quantity, thereby to form such ground faces on the individual inner faces of the recess 61 as are homogeneously inclined with respect to the vertical direction.

As the grinding stone 15 moves from one side to the other side of the recess 61, as shown in FIGS. 5 and 6, the rotating table 53 is rotated to turn the stone rotating mechanism 16 gradually. However, the position of the rotation axis P of the rotating table 53 and the center position of the leading end portion of the grinding stone 15 are substantially match each other. Even by rotating the rotating table 53, therefore, the grinding stone 15 is not turned while the contacting position of its leading end with the work 12 being moved only along the outer circumference of the leading end of the grinding stone 15. As a result, even if the rotating table 53 is rotated with the grinding stone 15 being close to the other side of the recess 61 of the work 12, it can be prevented from contacting with the other side of the recess 61 thereby to grind the recess 61 of the work 12 from one side to the other at one time, i.e., with one stroke.

Although the invention has been described in connection with its embodiment, it should not be limited in the least to the constitution described in the foregoing mode of embodiment but contains not only other modes of embodiment, as conceived within the range of the disclosure of claims, but also its modifications.

For example, the second moving device for moving the work table in the Y-direction is disposed above the base, and the first moving device for moving the work table in the X-direction is disposed on the second moving device. It is, however, arbitrary to interchange the first moving device and the second moving device. The fifth moving device for moving the stone rotating mechanism in the V-direction is disposed on the rotating table, and the fourth moving device for moving the stone rotating mechanism in the U-direction is disposed on the fifth moving device. It is, however, arbitrary to interchange the first moving device and the second moving device. It is, however, arbitrary to interchange the fifth moving device and the fourth moving device. Moreover, the U-direction and the V-direction are aligned with the X-direction and the Y-direction, respectively, but this alignment may not be made. Moreover, the U-direction and the V-direction, and the X-direction and the Y-direction are made perpendicular, respectively, in the horizontal plane, but may intersect at an arbitrary angle other than 90 degrees.

On the other hand, the recess of the work is ground from its one side to the other by the single operation. In case the recess has a complicated shape, for example, the grinding operation may also be performed by dividing the recess into a plurality of grinding areas to confirm the shape of the ground faces of the individual grinding areas.

What is claimed is:

1. A profile grinding machine comprising:

a base;

a work unit disposed on one side on the base and including a work table for gripping a work; and a stone unit disposed on another side on the base and including a stone rotating mechanism for holding and rotating a grinding stone about *an* axis thereof, wherein the work unit includes first, second and third moving devices for supporting and moving the work table in an X-direction and a Y-direction intersecting with each other in a horizontal plane, and in a Z-direction normal to the horizontal plane, respectively;

the stone unit includes a turning mechanism capable of turning the grinding stone about a vertical axis substantially coinciding with a leading end portion of the grinding stone, and the turning mechanism comprising*:* a rotatable table having a rotational axis *and fourth and fifth moving devices, the rotatable table being disposed above the base for rotating about the rotational axis, and the fourth and the fifth moving devices disposed above the rotatable table for supporting and moving the stone*

*rotating mechanism in a U-direction and a V-direction, intersecting with each other in the horizontal plane, respectively*; and a numerical controller which controls the first, second and third moving devices in the work unit and the rotatable table in the stone unit, wherein the numerical controller controls the work unit such that the work is moved in the X-direction and the Y-direction in synchronism with movement of the work in the Z-direction, and the numerical controller controls the stone unit to *move the stone rotating mechanism to a predetermined position and* rotate the [rotating] *rotatable* table at a predetermined angle on the rotational axis *such that the leading end portion of the grinding stone substantially coincides with the rotational axis of rotatable table*.

[2. The profile grinding machine according to claim 1, wherein the turning mechanism includes a rotating table disposed above the base for rotating about a rotation axis of the turning mechanism, and fourth and fifth moving devices disposed above the rotating table for supporting and moving the stone rotating mechanism in a U-direction and a V-direction intersecting with each other in the horizontal plane respectively.]

3. The profile grinding machine according to claim 1, further comprising an image pickup mechanism including a camera disposed above the base for taking an image of the work unit and the stone unit.

[4. The profile grinding machine according to claim 1, wherein the rotational axis substantially coincides with the leading end portion of the grind stone.]

5. The profile grinding machine according to claim 1, wherein the rotational axis extends in the Z-direction.

*6. The profile grinding machine according to claim 1, wherein the work table comprises:*

*a work fixing bed that directly grips the work;*

*a first work bed that supports the work fixing bed;*

*a second work bed that supports the first work bed such that the first work bed is rotatable at a fine angle in the horizontal plane;*

*and a third work bed that supports the second work bed, wherein the work fixing bed is configured to be rotated at the fine angle through the first work bed so that the position of the work is finely adjusted.*

*7. The profile grinding machine according to claim 6, wherein the third moving device comprises:*

*a mounting bed that fixes a base side of the third work bed of the work table;*

*a Z-direction carriage configured to move back and forth in the Z-direction on a pair of Z-direction rails attached to a back side of the mounting bed and arranged parallel to the Z-direction; and a Z-axis column that supports the Z-direction rails in the Z-direction.*

*8. The profile grinding machine according to claim 7, wherein the first moving device comprises:*

*a column bed that mounts the Z-axis column;*

*an X-direction carriage configured to move back and forth in the X-direction on a pair of X-direction rails attached to a back side of the column bed and arranged parallel to the X-direction, and an X-axis column that supports the X-direction rails in the X-direction.*

*9. The profile grinding machine according to claim 8, wherein the second moving device comprises:*

*a Y-direction carriage configured to move back and forth in the Y-direction on a pair of Y-direction rails attached to a back side of the X-axis column and arranged on the one side of the base.*

* * * * *